United States Patent [19]

Rokop et al.

[11] 3,953,005

[45] Apr. 27, 1976

[54] APPARATUS FOR CUTTING CONTINUOUSLY CAST METAL STRANDS INTO BILLETS

[75] Inventors: Joseph Rokop, Pittsburgh; Geoffrey W. Hughes, McMurray, both of Pa.

[73] Assignee: Rokop Corporation, Pittsburgh, Pa.

[22] Filed: Jan. 16, 1975

[21] Appl. No.: 541,414

[52] U.S. Cl. ................................. 266/50; 164/263
[51] Int. Cl.² ..................... B23K 7/02; B23K 37/02
[58] Field of Search ............... 148/9; 164/262, 263; 198/40; 266/23 R, 23 KC

[56] References Cited
UNITED STATES PATENTS

| | | | |
|---|---|---|---|
| 3,339,903 | 9/1967 | Reinfeld et al. | 266/23 KC |
| 3,495,651 | 2/1970 | Rokop et al. | 266/23 KC X |
| 3,692,292 | 9/1972 | Rokop et al. | 266/23 KC |
| 3,901,491 | 8/1975 | Ventesi et al. | 164/263 X |

*Primary Examiner*—Roy Lake
*Assistant Examiner*—Paul A. Bell
*Attorney, Agent, or Firm*—Brown, Murray, Flick & Peckham

[57] ABSTRACT

Extending downwardly from a guide rod above the rear end of a cutting table that supports a continuously cast metal strand as it travels forward over the table are a torch arm and a feeler arm, the upper ends of which are slidably and rotatably mounted on the rod to permit their lower ends to be swung transversely of the table independently of each other. A cutting torch secured to the torch arm is directed downwardly from it, and the feeler arm extends below the torch for engaging one side of a metal strand on the table. The feeler arm carries means for engaging the torch arm to position the lower end of the torch over the upper edge of the same side of a strand that the feeler arm is engaging. Located forward of the guide rod is a stop for engagement by the leading end of the strand for movement forward with it. There are means for connecting the stop with the arms-supporting means for moving the arms forward with the stop, and cam means for swinging the torch arm across the strand as that arm is moved forward with the strand, whereby to cut the strand and thereby form a billet.

9 Claims, 12 Drawing Figures

APPARATUS FOR CUTTING CONTINUOUSLY CAST METAL STRANDS INTO BILLETS

In U.S. Pat. No. 3,692,292 and others similar to it a continuously cast metal strand is automatically cut into billets of the desired length by a cutting torch that moves across the strand as the latter travels forward. The front end of the strand engages a stop that it pushes ahead to pull the cutting torch forward at the same speed as the strand. After a billet has been cut from the strand, the stop is disengaged from the billet and moves back to become engaged again by the oncoming strand. The theory of operation of such apparatus is good, but in practice the apparatus has not been very reliable, and reliability is of the utmost importance in cutting billets from continuously cast metal strands. Accordingly, it is among the objects of this invention to provide such strand-cutting apparatus that is considerably more reliable than similar apparatus known heretofore, and which is easy to adjust for cutting billets of different lengths and cross sectional areas.

The preferred embodiment of the invention is illustrated in the accompanying drawings, in which.

Figure 1:
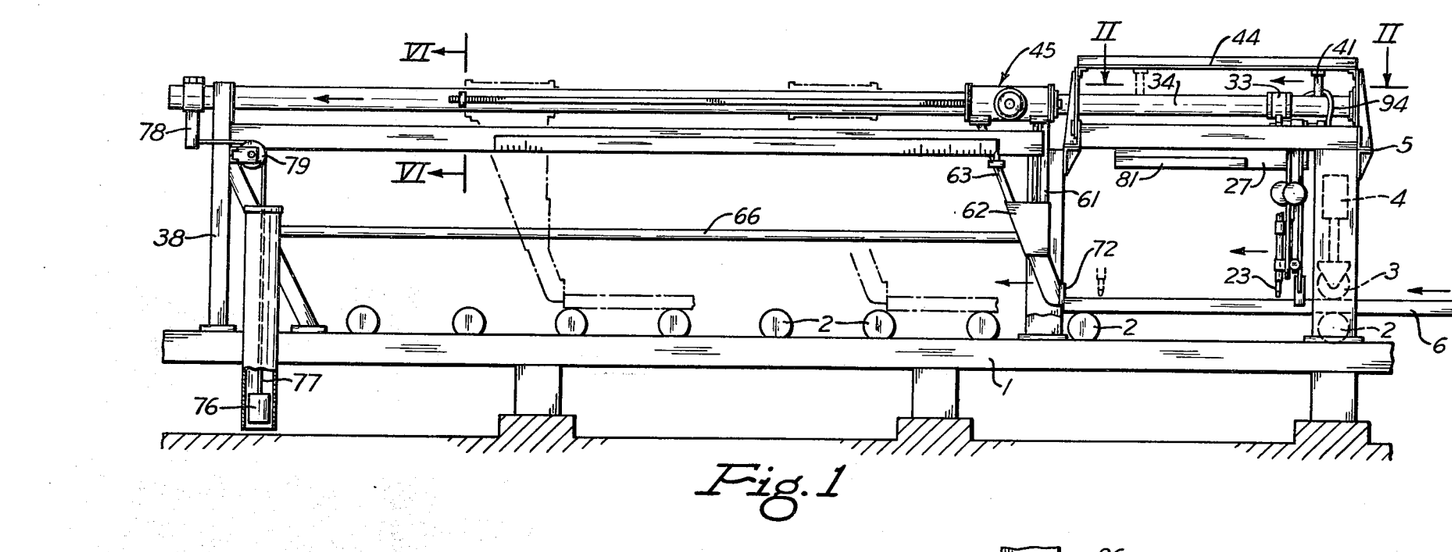
FIG. 1 is a side view of the apparatus.

Referring to FIG. 1 of the drawings, a cutting table 1 is provided with a number of driven rollers 2. Directly above the first roller on the table there is a hold-down roll 3 that is constantly urged downwardly, such as by a fluid pressure cylinder 4 mounted in the rear end of the frame 5 of a cut-off mechanism. This hold-down roll engages the top of a continuously cast metal strand 6 that is fed forward between the hold-down roll and the roller beneath it. As the strand travels forward through the cut-off mechanism, it is cut into billets of any desired length, which are carried forward by the rollers in front of the cut-off mechanism.

Figure 3:
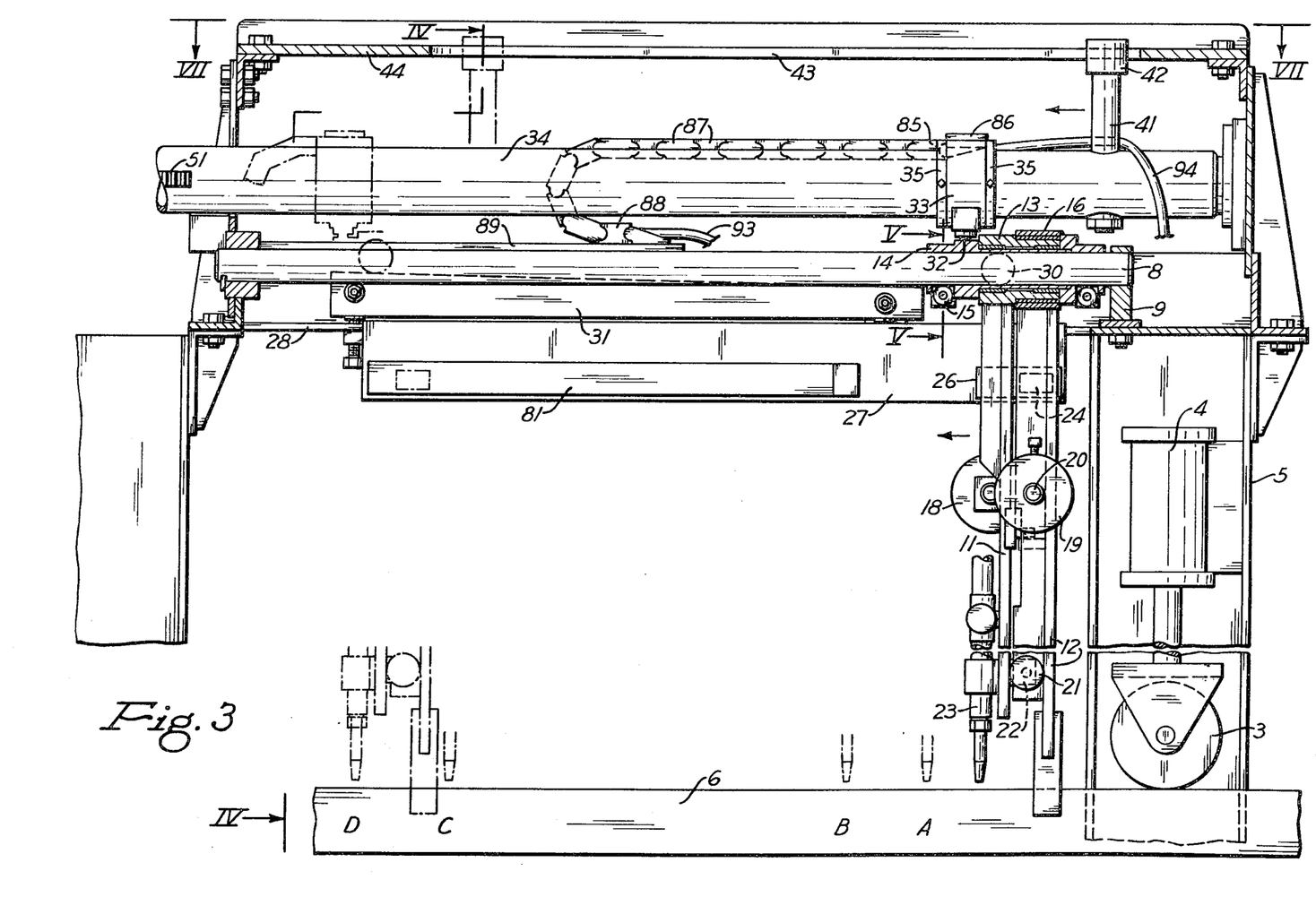
FIG. 3 is an enlarged longitudinal vertical section of the cut-off mechanism.
Figures 4, 5:
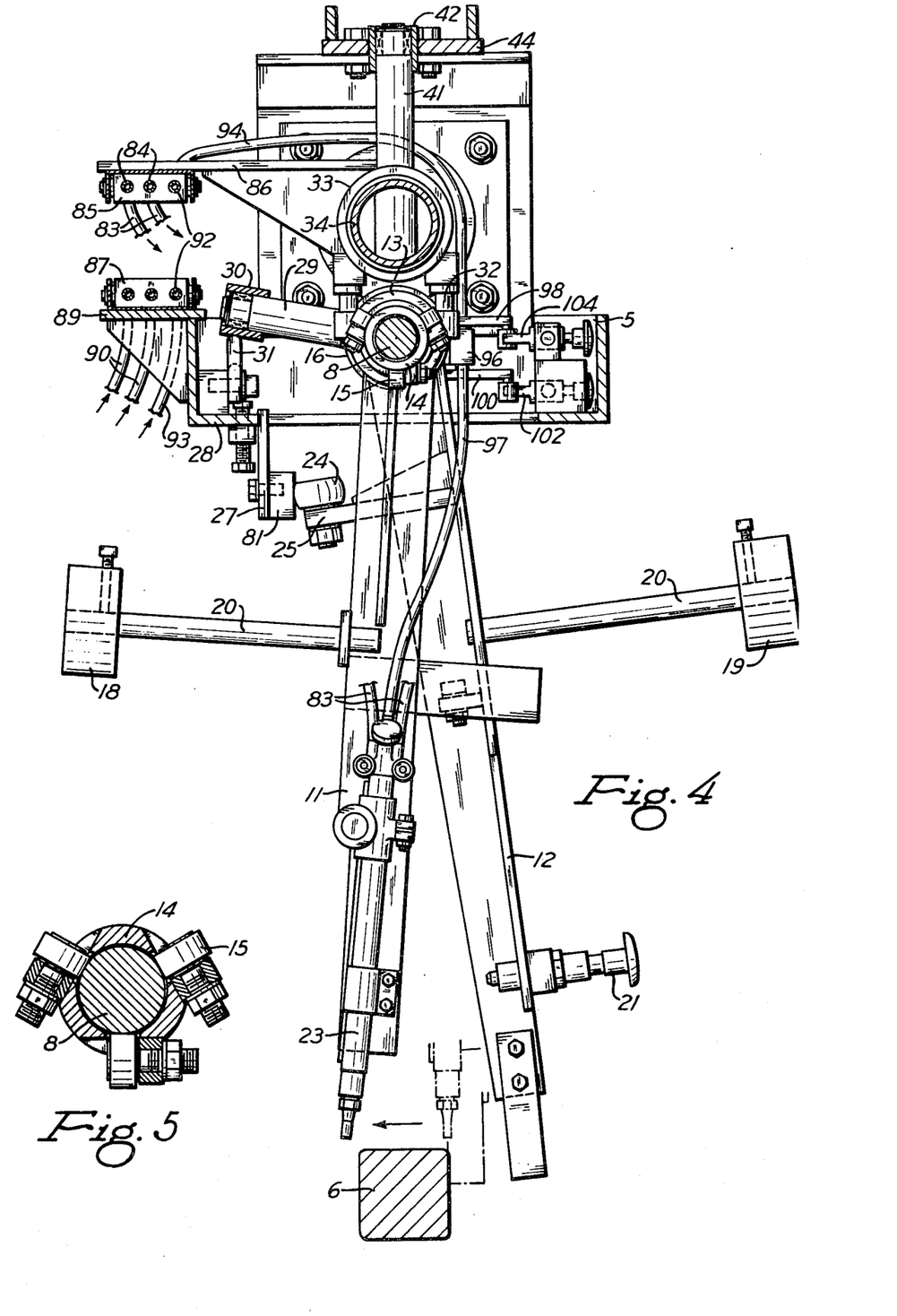
FIG. 4 is a further enlarged vertical section taken on the line IV—IV of FIG. 3 when the torch is in its forward dotted-line position.
FIG. 5 is an enlarged vertical section taken on the line V—V of FIG. 3.

As shown in FIGS. 3, 4 and 5 of the drawings, the cut-off mechanism includes a guide rod 8 above the centerline of the table, the rear end of the rod being mounted in a bracket 9 on the rear end of the frame 5, and the front end being supported by the front end of the frame. Extending downwardly from the guide rod are a torch arm 11 and a feeler arm 12. The upper end of the torch arm is rigidly connected to a collar 13 that encircles a sleeve 14 mounted on the guide rod, where it is supported for axial movement by circumferentially spaced rollers 15 attached to the sleeve and extending through slots in it to bear against the rod at each end of the sleeve. The upper end of the feeler arm is rigidly connected to a ring 16 that encircles the rearwardly projecting portion of collar 13, on which the ring can pivot. Consequently, the two arms can be moved forward on the guide rod and their lower ends can be swung back and forth together or independently of each other in a direction transverse to the cutting table.

The lower ends of these arms are urged in opposite directions by means of counterweights 18 and 19 adjustably mounted on rods 20 projecting laterally in opposite directions from the two arms, but the distance the arms can move is controlled as will be described presently. The maximum distance that the counterweights can swing the lower ends of the arms toward each other is determined by a manually adjustable screw 21 mounted in the lower end portion of the feeler arm for engagement with a stop 22 (FIG. 3) projecting from the back of the torch arm. The lower end of the torch arm terminates some distance above the strand below it, and a cutting torch 23 is mounted on the arm with the tip of the torch extending below it. The position of the torch on the arm is such that when the torch is substantially vertical its axis will be directly above one side of the strand as shown in dotted lines in FIG. 4.

When the two arms are at the rear end of guide rod 8, a cam follower roller 24 (FIG. 4) mounted on a bracket 25 projecting from one side of feeler arm 12 is in engagement with a cam 26 (FIG. 3) extending along a vertical plate 27 that extends downwardly from an angle bar 28 connecting the front and back of frame 5. This holds the lower end of the feeler arm away from the strand. At this time, the counterweight 18 on the torch arm holds stop 22 against the adjusting screw 21 so that the nozzle of the torch will be directed away from the strand at the same side as the lower end of the feeler arm. While in this position, a rod 29 (FIG. 4) projecting from one side of collar 13 is in a horizontal position and supports a cam follower roller 30 at its outer end, but the roller is not in engagement with any cam at this time. Ahead of this roller a long cam bar 31 is mounted on angle bar 28. The cam bar is provided with a forwardly and upwardly inclined upper surface that will raise the roller and thereby swing the torch across the strand as the two arms are moved forward on the guide rod. The inclination of this cam bar is adjustable to regulate the speed at which the torch is swung across the strand.

Figure 6:
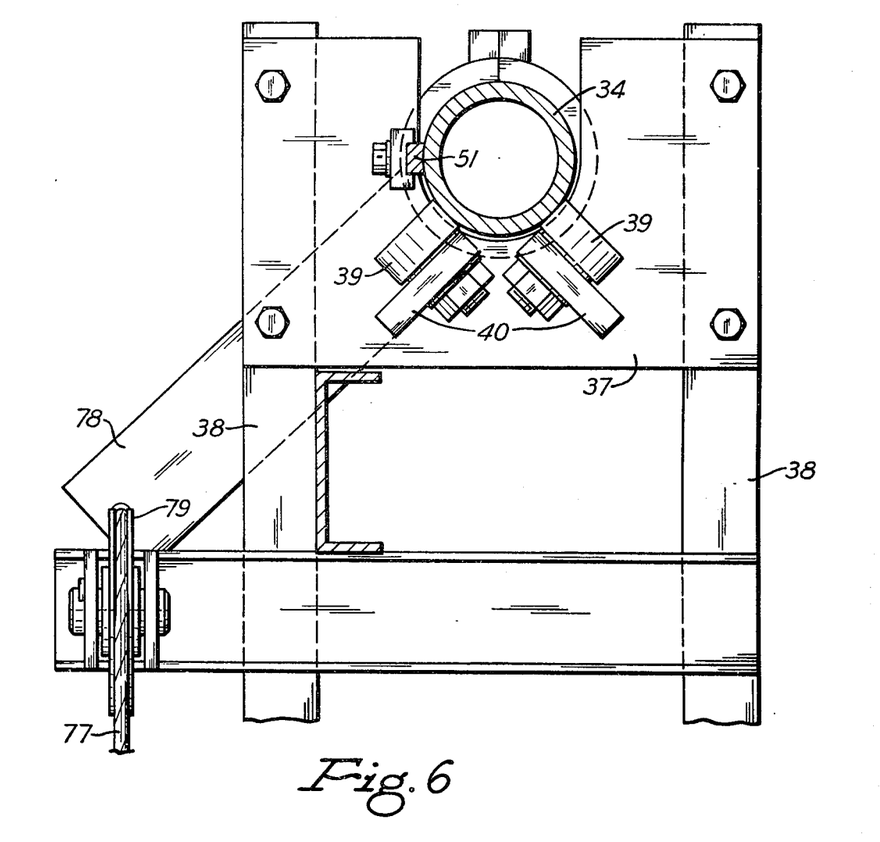
FIG. 6 is an enlarged fragmentary vertical section taken on the line VI—VI of FIG. 1.
Figure 7:
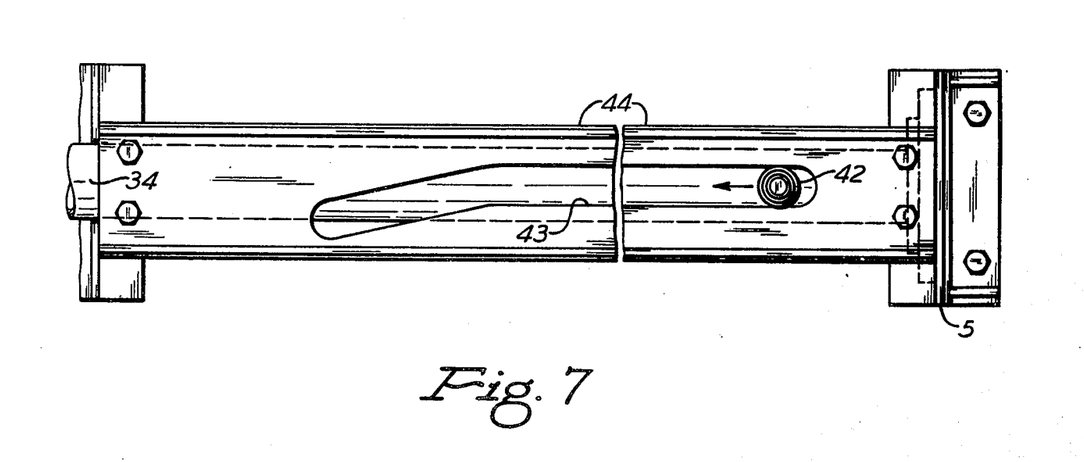
FIG. 7 is a fragmentary plan view taken on the line VII—VII of FIG. 3.

In order to move the two arms forward, a pair of upwardly extending pins 32 seen in FIGS. 3 and 4 rigidly connect the front end of sleeve 14 with the lower portion of a ring 33 that encircles a long tube 34, herein called a push rod, extending lengthwise of the table above guide rod 8. The push rod can turn in this ring, so in order to prevent the rod from also sliding axially in it, the ring is held in position on the push rod by a pair of collars 35 secured rigidly to the rod in engagement with the ends of the ring. The ring supports the rear end portion of the push rod. As shown in FIG. 6, the front end of the push rod extends through a recess in a plate 37 supported by legs 38 at the front end of the cutting table. Rollers 39 mounted on brackets 40 attached to this plate support the push rod and allow it to be moved axially and also to be turned on its axis. Between ring 33 and the rear end of the push rod, a short rod 41 extends upwardly from the push rod and supports a cam follower roller 42 on its upper end disposed in a cam slot 43 that extends lengthwise of the push rod in a cam plate 44 mounted at its ends on the ends of the frame. As shown in FIG. 7, the front end portion of the cam slot extends obliquely away from the main part of the slot so that when the roller enters this oblique portion, the push rod will be turned in ring 33 a few degrees. The means for moving the push rod forward and the reason for turning it will now be described.

Figures 8, 9:
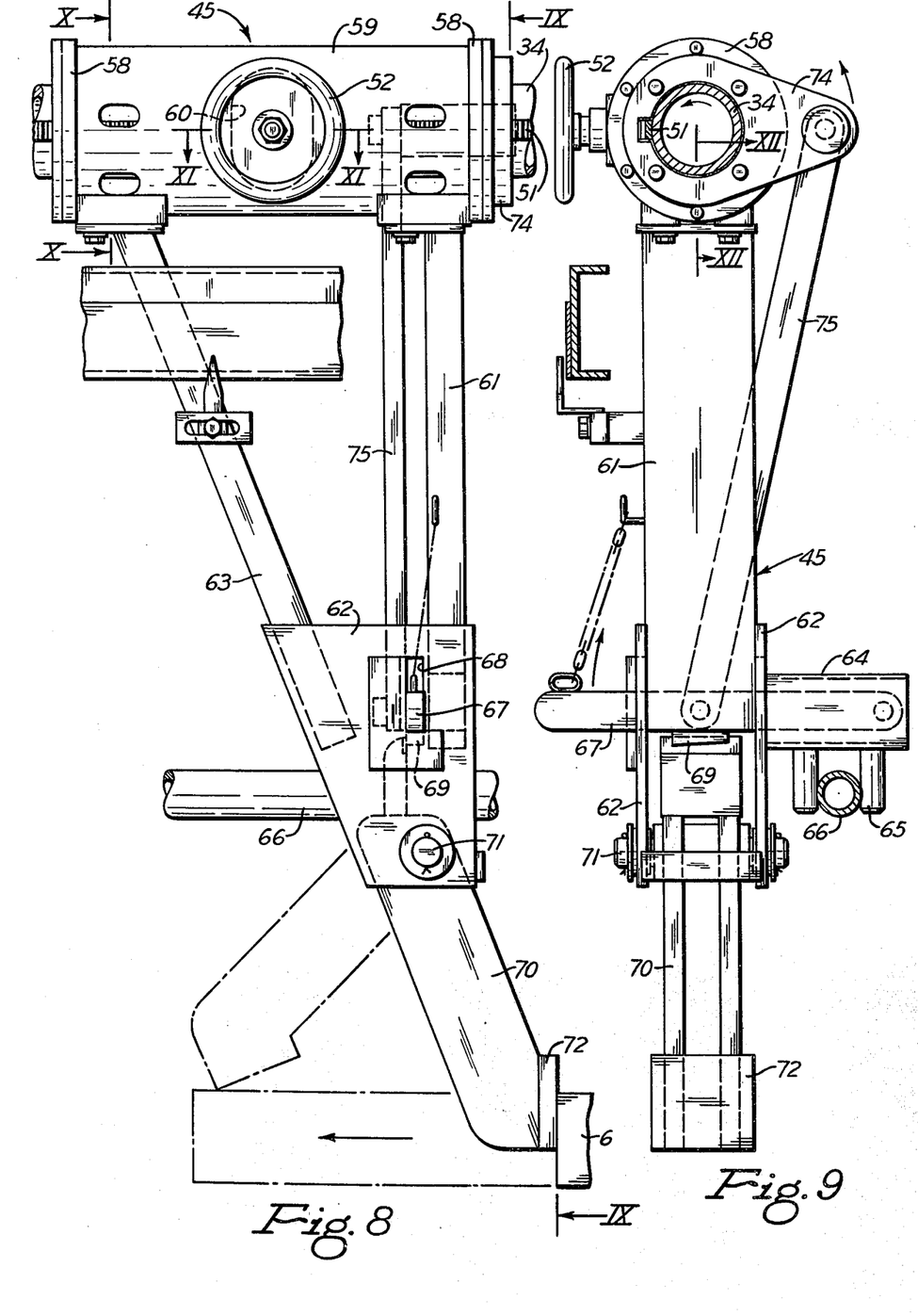
FIG. 8 is an enlarged side view of the stop mechanism.
FIG. 9 is a vertical section taken on the line IX—IX of FIG. 8.
Figure 10:
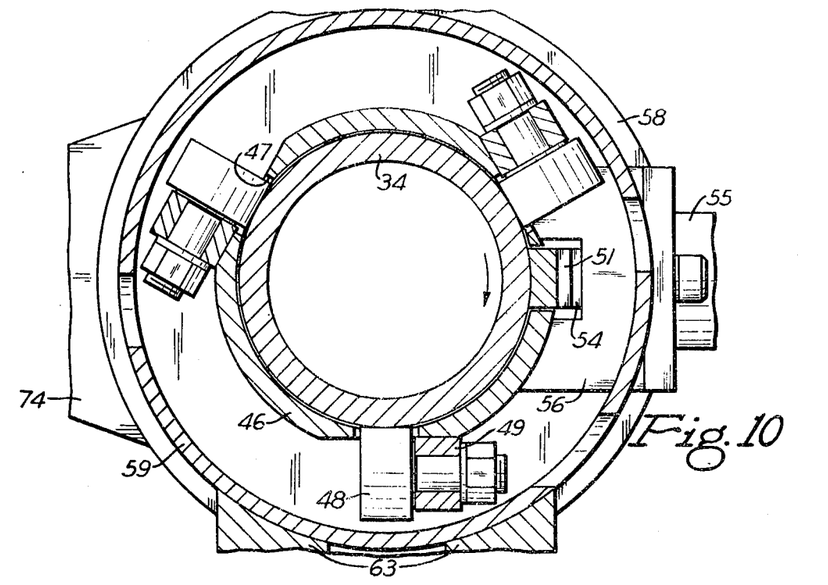
FIG. 10 is an enlarged fragmentary vertical section taken on the line X—X of FIG. 8.
Figure 11:
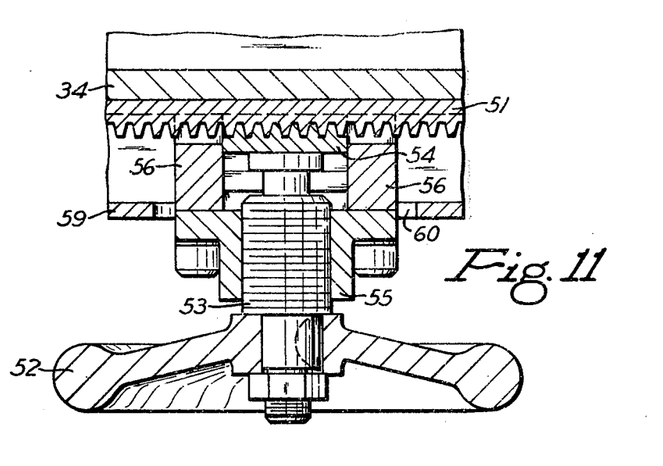
FIG. 11 is an enlarged horizontal section taken on the line XI—XI of FIG. 8.
Figure 12:
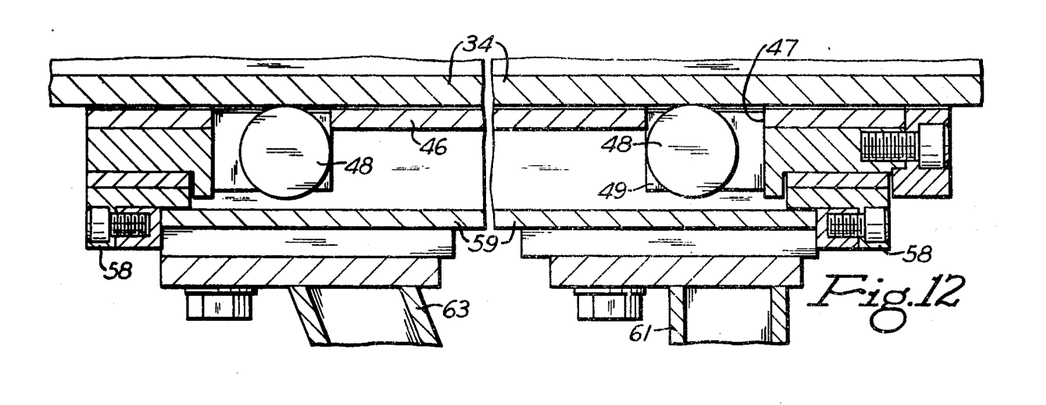
FIG. 12 is an enlarged fragmentary vertical section taken on the line XII—XII of FIG. 9.

The push rod 34 supports in front of the cut-off mechanism a stop mechanism 45 that is engaged by the front end of the forwardly moving strand as shown in FIGS. 1 and 8. When thus engaged, the stop mechanism moves the push rod forward with the strand, and the push rod, through ring 33 and pins 32 and sleeve 14, moves the torch arm and feeler arm forward on the guide rod. As shown in FIGS. 10 to 12, the stop mechanism includes a sleeve 46 encircling the push rod and provided near its opposite ends with circumferentially spaced slots 47. Rollers 48 are mounted in bearings 49 secured to the outside of the sleeve and project through the slots into engagement with the push rod. Extending along one side of the push rod and secured to it is a rack bar 51. The sleeve is split lengthwise to accommodate this bar as shown in FIG. 10. The sleeve can be locked to the push rod at any desired point along the length of the rod by turning a hand wheel 52 on the outer end of a screw 53 which carries a toothed member 54 at its inner end for engagement with the rack teeth as shown in FIG. 11. The screw is threaded in a collar 55 secured to spaced blocks 56 that are welded to the sleeve above and below the rack. While the toothed member is in engagement with the rack, the sleeve is immobile relative to the push rod. The position of the stop mechanism on the push rod determines the length of the billets that will be cut from the strand, the left-hand dotted-line position of the stop mechanism in FIG. 1 determining the maximum billet length.

Encircling sleeve 46 and rollers 48 between flanges 58 at the opposite ends of the sleeve is a cylinder 59 that is provided in one side with an enlarged opening 60, through which the locking screw 53 for the rack bar extends. Rigidly connected to the bottom of this cylinder at the end nearest the cut-off mechanism, as shown in FIGS. 1, 8 and 9, is the upper end of a vertical post 61, at the lower end of which a pair of parallel plates 62 are secured to its opposite sides. These plates extend below the post. They also are secured to the lower end of a diagonal brace 63 that is connected at its upper end to the opposite end of cylinder 59. Projecting laterally from one of the plates, there is a channel member 64 provided with a pair of downwardly extending pins 65 that straddle a guide tube 66 extending lengthwise of the cutting table to prevent cylinder 59 from turning on the push rod. The outer end of this channel pivotally supports one end of a lever 67 that extends laterally through aligned slots 68 in plates 62 and projects from them. The portion of this lever between the plates supports a latch member 69 that normally engages the rear face of the upper end of an arm 70 that is pivoted on a horizontal pin 71 extending through the two plates. The arm extends downwardly from the plates and supports at its lower end a stop plate 72 having a vertical rear face that is engaged by the front end of the strand.

It will be seen that when the strand pushes forward against stop plate 72, the entire stop mechanism will be moved forward and, due to its rigid connection to the push rod, will push that rod forward with it. When the push rod is pushed forward far enough for the strand-cutting operation to be completed, the stop must move out of the way of the billet that has just been cut from the strand so that the stop mechanism and the push rod can be returned to their starting position for engagement of the stop by the front end of the strand again, the billet having been carried forward away from the strand in the meantime by driving the rollers 2 at the front part of the cutting table faster than those behind. Removal of the stop from the path of the billet is accomplished by the billet itself immediately following turning of the push rod on its axis, which occurs immediately after billet cut-off and as the cam follower roller 42 moves along the oblique portion of the cam slot 43, to the dotted-line position shown in FIGS. 1 and 3. At this time, the stop mechanism 45, if it started from its full-line position in FIG. 1, will be in the right-hand dotted-line position in that figure.

This turning of the push rod rotates the stop mechanism sleeve 46 encircling it, and the rotating sleeve swings the outer end of an arm 74 rigidly mounted on one end of the sleeve upwardly a few degrees. As shown in FIG. 9, this arm is pivotally connected by a link 75 with the central portion of the latch lever 67, so the lever is swung upwardly to release the latch 69 from the stop arm 70. As soon as this is done, the forwardly travelling billet swings stop plate 72 forward until it leaves the front end of the billet and rides on top of it, as indicated in dotted-lines in FIG. 8. Immediately thereafter, the push rod starts moving back to its original position, this movement being caused by a counterweight 76 on one end of a cable 77, the opposite end of which is connected to an arm 78 extending away from one side of the front end of the push rod. The cable passes over a sheave 79 supported by one of the front legs of the table. At the beginning of its return travel, the cam follower roller 42 in the oblique front end portion of cam slot 43 rotates push rod 34 back to its original position, whereby latch lever 67 swings down to latching position. As soon as the stop plate 72 drops off the rear end of the billet, the plate swings down and rearwardly and the upper end of the stop arm 70 swings forward past latch member 69 and then cannot swing backward again until the latch member is released again by raising the latch lever.

When the front end of a strand engages the stop plate 72 of stop mechanism 45, the latter is moved forward with the strand and, through the stop mechanism, moves the push rod 34 forward with the strand. Just before the start of this movement, the torch is in the full-line position shown in FIG. 3. At this time, the cam-follower roller 24 carried by the feeler arm is in engagement with the rear cam 26 so that the lower end of the feeler arm is swung away from the strand. Counterweight 18 swings the torch arm toward the feeler arm and holds stop 22 against adjusting screw 21. As the arms are pulled ahead on guide rod 8 to the dotted-line position A of the torch, roller 24 runs off cam 26 and the lower end of the feeler arm swings into engagement with the adjacent side of the strand. In doing this, the engagement of adjusting screw 21 with stop 22 on the torch arm causes the feeler arm to move the torch arm into the dotted-line position in FIG. 4, in which the torch flame is directed down across the same side of the strand to preheat it. This preheating continues while the torch is moved from dotted-line position A in FIG.

3, to dotted-line position B, whereupon cam roller 24 runs onto a long cam 81 mounted on plate 27 in front of cam 26 and swings the feeler arm away from the strand to move it away from the heat of the torch. At about the same time, the cam-follower roller 30 carried by the upper end of the torch arm engages the inclined cam bar 31 and is moved upwardly as the arms continue to move forward on the guide rod. This upward movement of the roller slowly swings the tip of the torch across the strand in order to cut the strand in two. By the time the torch reaches the dotted-line position C in FIG. 3, the strand will have been cut through to form a billet. The arms continue to move forward a short distance until the torch is in position D in FIG. 3, by which time the cam-follower roller 42 carried by the rear end of the push rod will have moved far enough into the oblique front end portion of cam slot 43 to rotate the push rod enough to release stop mechanism 45 from the front end of the billet so that the push rod can be returned by counterweight 76 to its rear position, carrying the two arms along with it.

Figure 2:
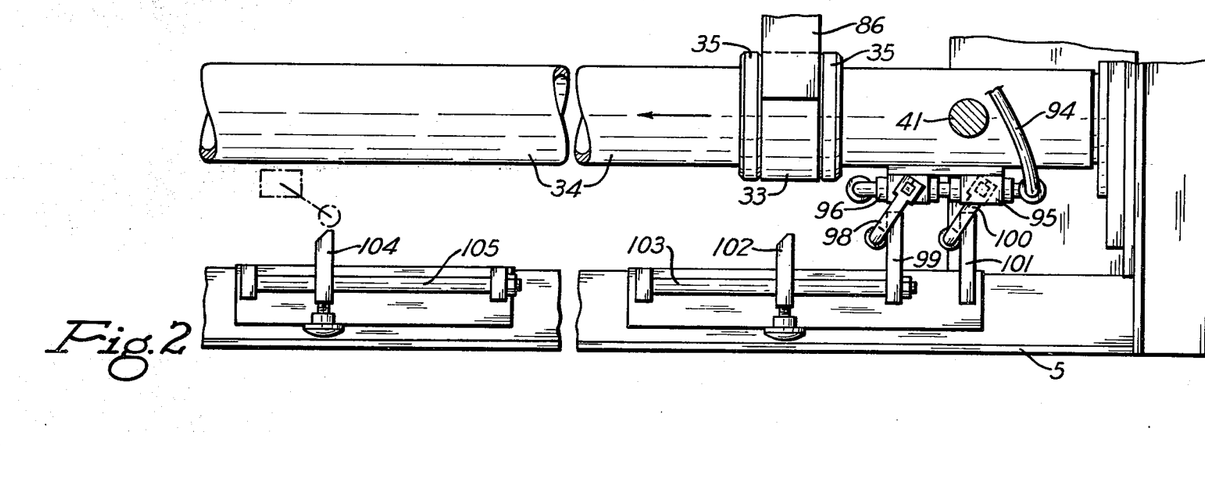
FIG. 2 is an enlarged fragmentary horizontal section taken on the line II—II of FIG. 1.

The flexible tubes 83 (FIG. 4) connected to the cutting torch for conducting gases to it to maintain a flame at the torch tip are connected to the outlets of flexible tubes 84 projecting from a block 85 supported by a bracket 86 projecting from one side of ring 33 on the push rod. This block is connected by pivoted links 87, through which tubes 84 extend, to another block 88 mounted on a plate 89 secured to angle bar 28 of frame 5. The inlet ends of tubes 84 are connected by tubes 90 to a suitable source of supply for the required gases. The blocks and links just described also contain a third flexible tube 92 connected by a tube 93 with a supply of cutting oxygen. As shown in FIGS. 2 and 4, the outlet of tube 92 is connected by a tube 94 to the inlet of a valve 95 that is connected in series with a valve 96, the outlet of which is connected by a flexible tube 97 with the cutting torch. The flow of cutting oxygen to the torch is controlled by these two valves mounted at different levels on the side of push rod 34. When the valve-actuating levers are in their rear position shown in FIG. 2, the lever 98 of the upper valve 96 has been swung forward by striking a dog 99 to open that valve, and the lever 100 for the lower valve 95 has been swung forward by striking a dog 101 to close that valve so that no cutting oxygen is supplied to the torch.

While the valves are being carried forward by the push rod as the torch travels from position A to position B in FIG. 3, the flame from the torch preheats the strand until the lower valve lever 100 strikes a dog 102 by which it is swung to open the valve so that the cutting oxygen can flow to the torch. This dog is adjustable lengthwise of a rod 103 to suit the length of time required for preheating the slab. With both valves open, the torch moves forward to position C and simultaneously is swung across the strand by cam 31 to cut through the strand. Immediately thereafter, the actuating lever 98 of the upper valve 96 strikes a dog 104, by which that valve is closed to shut off the cutting oxygen. This dog is adjustable along a rod 105 to suit the distance the torch must move ahead in order to completely sever the strand to form a billet. When the push rod is returned to its rear position by means of counterweight 77, the two valves are reversed by the two rear dogs 99 and 101 that are engaged by the valve-actuating levers, but the cutting oxygen remains cut off from the torch until the valves are carried forward again.

The table rollers directly in front of the front roller of the cut-off mechanism are slightly lower than that roller so that the front end of the billet will tilt down to make sure that its rear end will break away from the strand behind it as the transverse pass of the cutting torch is completed.

The apparatus disclosed herein is so constructed that it can be adjusted to always start the cutting operation at the right point on the strand and to make a straight cut across it. By applying pressure through the hold-down roll 3 to the top of the strand, the correct clearance is maintained between the upper surface of the strand and the tip of the torch. The feeler arm 12 always positions the torch correctly and then moves away from it. Separating the torch arm and torch from the push rod avoids undesirable vibrations in the torch due to deflections and vibrations in the push rod. Since there is not any lateral movement of the stop plate 72 across the front end of the billet during their disengagement from each other, there is no friction between them that could introduce excessive vibrations that would effect the performance of this apparatus.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. Apparatus for automatically cutting a continuously cast metal strand into billets, comprising a cutting table for supporting such a strand as it travels forward over the table, a guide rod above the rear end of the table and extending lengthwise of it, a torch arm and a feeler arm extending downwardly from the guide rod, means secured to the upper ends of said arms and slidably and rotatably mounted on the guide rod to support the arms independently of each other and permit their lower ends to be swung transversely of the table independently of each other, a cutting torch secured to the torch arm and directed downwardly therefrom, the feeler arm extending below the torch for engaging one side of a strand on the table but normally spaced laterally from the strand, the torch arm being rotatable on said guide rod toward the feeler arm, means carried by the feeler arm for engaging the torch arm to reverse said rotation of the torch arm and position the lower end of the torch over the upper edge of said side of a strand when the feeler arm swings into engagement with said side, a stop above the table forward of said guide rod for engagement by the leading end of the strand and movable forward by it, means connecting the stop with said arms-supporting means for moving said arms forward on said guide rod with the stop, and means for swinging the torch arm away from the feeler arm and across the strand as said arms are moved forward with the strand, whereby to cut the strand and thereby form a billet.

2. Automatic cutting apparatus according to claim 1, including means for swinging the feeler arm out of engagement with the torch arm and away from a strand on said table after said arms have moved forward on said guide rod a predetermined distance.

3. Automatic cutting apparatus according to claim 2, in which said last-mentioned means include a stationary cam, and a cam follower carried by the feeler arm and engaging said stationary cam.

4. Automatic cutting apparatus according to claim 1, in which said connecting means include a support for said stop movable by it forward above the table, and means carried by said stop support and connected with said arms-supporting means for moving said arms forward on said guide rod.

5. Automatic cutting apparatus according to claim 4, in which said stop support is an elongated member extending lengthwise of said table, and said apparatus includes means supporting said member for longitudinal movement, means for turning said member on its longitudinal axis when it has been moved forward a predetermined distance by said stop, and means actuated by the turning of said member to release said stop so that the billet engaging it can pass beneath it, and means for moving said elongated member backward with the stop when the stop is released.

6. Automatic cutting apparatus according to claim 4, including means for supplying inflammable gas to said torch to produce a flame, valve means carried by said stop support, conduits connected with said valve means and torch for supplying oxygen to the torch to produce a cutting flame, and means for opening and closing said valve means as said stop support moves forward and backward.

7. Automatic cutting apparatus according to claim 6, in which said valve means include a normally closed and a normally open valve connected in series, and said opening and closing means include means for opening the normally closed valve as it is moved forward, means for closing the normally open valve as it completes its forward stroke, and means for reversing the valves when they are returned to their rear position.

8. Automatic cutting apparatus according to claim 7, in which said valves include laterally projecting operating levers, said valve opening and closing means are stationary dogs located in front of said levers for swinging them rearwardly when the forwardly-moving stop support moves the levers into engagement with said dogs, and said valve-reversing means are stationary dogs disposed in the path of said levers as the valves are returned to their rear position, whereby to swing the levers forward.

9. Automatic cutting apparatus according to claim 1, including cams for swinging said arms away from each other, and counterweights supported by the arms for swinging them toward each other.

* * * * *